United States Patent
Watanabe

(10) Patent No.: US 12,435,240 B2
(45) Date of Patent: Oct. 7, 2025

(54) COATING COMPOSITION FOR AN OUTER WALL OR EXTERIOR OF BUILDING, AND AN ARTICLE COMPRISING THE COATING COMPOSITION

(71) Applicant: Nissin Chemical Industry Co., Ltd., Echizen (JP)

(72) Inventor: Kentaro Watanabe, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 0 days.

(21) Appl. No.: 17/585,975

(22) Filed: Jan. 27, 2022

(65) Prior Publication Data
US 2022/0243092 A1 Aug. 4, 2022

(30) Foreign Application Priority Data
Jan. 28, 2021 (JP) .................... 2021-011998

(51) Int. Cl.
| | | |
|---|---|---|
| C09D 183/04 | (2006.01) | |
| C08G 77/20 | (2006.01) | |
| C08L 83/04 | (2006.01) | |
| C09D 7/40 | (2018.01) | |
| C09D 7/61 | (2018.01) | |
| E04F 13/08 | (2006.01) | |

(52) U.S. Cl.
CPC ........... *C09D 183/04* (2013.01); *C08G 77/20* (2013.01); *C08L 83/04* (2013.01); *C09D 7/40* (2018.01); *C09D 7/61* (2018.01); *E04F 13/08* (2013.01); *C08L 2201/02* (2013.01); *C08L 2201/52* (2013.01); *C08L 2205/02* (2013.01); *Y10T 428/31663* (2015.04)

(58) Field of Classification Search
CPC .......... C09D 183/04; C09D 7/40; C09D 7/61; C09D 167/08; C09D 151/085; C09D 5/18; C09D 7/20; C09D 133/00; C09D 7/65; C08G 77/20; C08G 77/442; C08G 77/42; C08L 83/04; C08L 2201/02; C08L 2201/52; C08L 2205/02; C08L 33/04; C08L 43/04; C08L 51/085; E04F 13/08; Y10T 428/31663; C08F 230/08; C08F 283/124; C08K 2003/2227; C08K 2003/2241

See application file for complete search history.

(56) References Cited

U.S. PATENT DOCUMENTS

| | | | |
|---|---|---|---|
| 5,973,068 A | 10/1999 | Yamaya et al. | |
| 6,153,694 A * | 11/2000 | Miyatake | C08F 291/02 |
| | | | 525/100 |
| 2005/0143520 A1 * | 6/2005 | Saegusa | C08L 69/00 |
| | | | 525/100 |
| 2006/0069198 A1 * | 3/2006 | Okuda | C08F 283/124 |
| | | | 526/201 |
| 2016/0177408 A1 | 6/2016 | Watanabe | |
| 2020/0102473 A1 | 4/2020 | Watanabe | |
| 2020/0239972 A1 | 7/2020 | Watanabe | |

FOREIGN PATENT DOCUMENTS

| | | |
|---|---|---|
| CN | 101143988 A | 3/2008 |
| CN | 110964425 A | 4/2020 |
| EP | 1 772 500 A2 | 4/2007 |
| JP | 11-49984 A | 2/1999 |
| JP | 2007-99953 A | 4/2007 |
| JP | 2009-191228 A | 8/2009 |
| JP | 2010-111820 A | 5/2010 |
| JP | 2016-138242 A | 8/2016 |
| JP | 2020-90563 A | 6/2020 |
| JP | 2020-90596 A | 6/2020 |

OTHER PUBLICATIONS

Extended European Search Report for European Application No. 22153088.4, dated Jun. 24, 2022.
English translation of the Chinese Office Action for Chinese Application No. 202210106611.9, dated Dec. 26, 2024.
European Communication pursuant to Article 94(3) EPC for European Application No. 22 153 088.4, dated Aug. 1, 2025.

* cited by examiner

*Primary Examiner* — Michael B Nelson
(74) *Attorney, Agent, or Firm* — Birch, Stewart, Kolasch & Birch, LLP

(57) ABSTRACT

The purpose of the present invention is to provide a coating composition for outer walls and building exteriors, which gives a substrate water repellency, water resistance, rain streak stain resistance, stain resistance, and weather resistance; and an article, a building material for outer walls and building exteriors, each having a coating formed from the aforesaid coating composition. The present invention provides a coating composition for an outer wall or exterior of building, wherein the coating composition comprises the following components (A) to (D): (A) an emulsion of a silicone acrylic copolymer resin which is a copolymer of 60 to 99 parts by mass of (a1) a polyorganosiloxane represented by the formula (1) and 1 to 40 parts by mass of (a2) an acrylic acid ester monomer and/or a methacrylic acid ester monomer, provided that a total amount of components (a1) and (a2) is 100 parts by mass, the emulsion being in an amount of 0.5 to 20 parts by mass as a solid content, (B) at least one resin emulsion in an amount of 20 to 80 parts by mass as a solid content, selected from the group consisting of acrylic resin emulsions other than component (A), urethane resin emulsions and alkyd resin emulsions, (C) pigment in an amount of 1 to 50 parts by mass, and (D) a flame retardant in an amount of 1 to 10 parts by mass, provided that a total mass of the solid contents of components (A) and (B) and the amounts of components (C) and (D) is 100 parts by mass.

7 Claims, No Drawings

COATING COMPOSITION FOR AN OUTER WALL OR EXTERIOR OF BUILDING, AND AN ARTICLE COMPRISING THE COATING COMPOSITION

CROSS REFERENCE

This application claims the benefits of Japanese Patent Application No. 2021-011998 filed on Jan. 28, 2021, the contents of which are hereby incorporated by reference.

BACKGROUND OF THE INVENTION

The present invention relates to a coating composition, in particular, for coating outer walls and building exteriors, more specifically, a water-based coating composition which is to be applied on a substrate such as ceramic building material (such as siding board), concrete, wood substrate, metal substrate, or mortar substrate to give the substrate excellent water repellency, water resistance, rain streak stain resistance, stain resistance, and weather resistance, while maintaining design specific to the substrate. The present invention relates also to an article having a coating formed from the aforesaid water-based coating composition.

In the field of coatings for outer walls or building exteriors, a dispersion medium has recently been changed from an organic solvent-based one to a water-based one in consideration of environmental problems. In particular, volatile organic compounds may cause sick house syndrome, so that water-based coatings are eagerly desired. Acrylic resins, urethane resins and alkyd resins have excellent film-forming ability and, therefore, have been used widely as a binder resin for water-based coatings. Silicone resins are known to give a substrate a sliding property and water repellency.

For example, Japanese Patent Application Laid-Open No. 2009-191228 (Patent Literature 1) describe a water-based resin composition comprising an emulsion having a multi-layer structure of three or more acrylic layers. A coating obtained from this water-based resin composition has a good film-forming property and excellent hardness and water resistance. However, the preparation steps of the emulsion having the multilayer structure of three or more layers are complicated, so that there is a demand for a development of a water-based resin composition which is prepared easier. In addition, the water-based resin composition comprises an acrylic component as a main component, so that there is a room to improve the water repellency and rain streak stain resistance.

Japanese Patent Application Laid-Open No. 2010-111820 (Patent Literature 2) describes a water-based water-repellent coating composition comprising a silicone-containing acrylic latex and a mixed wax emulsion. The composition is thought to have sufficient water repellency. However, due to the mixed wax emulsion contained, the coating formed from the composition may easily be stained by an oily component contained in rain water and have poor rain streak stain resistance.

Japanese Patent Application Laid-Open No. H11(1999)-49984 describes that an emulsion obtained by copolymerization of a silanol group-containing silicone resin and a radical polymerizable vinyl monomer has good weather resistance. However, the silicone resin has a silsesquioxane structure and there is a room to improve the stain resistance and rain streak stain resistance.

Japanese Patent Application Laid-Open No. 2007-099953 describes a graft copolymer emulsion composition for building outer walls, which further comprises a silicon resin-containing emulsion. The graft copolymer emulsion has a glass transition temperature (Tg) of less than 0° C. and is soft, so that here is a room to improve the stain resistance.

PRIOR LITERATURES

Patent Literatures

Patent Literature 1: Japanese Patent Application Laid-Open No. 2009-191228
Patent Literature 2: Japanese Patent Application Laid-Open No. 2010-111820
Patent Literature 3: Japanese Patent Application Laid-Open No. H11(1999)-49984
Patent Literature 4: Japanese Patent Application Laid-Open No. 2007-099953

SUMMARY OF THE INVENTION

Problems to be Solved by the Invention

The purpose of the present invention is to provide a coating composition for outer walls and building exteriors, which gives a substrate water repellency, water resistance, rain streak stain resistance, stain resistance, and weather resistance; and an article, a building material for outer walls and building exteriors, which article has a coating formed from the aforesaid coating composition.

The present inventors conducted keen researches to solve the aforesaid problems and have found that a coating composition comprising (A) a specific silicone acrylic copolymer resin emulsion, (B) a specific resin emulsion other than the aforesaid component (A), (C) a pigment, and (D) a flame retardant in a predetermined proportion and a water-based coating formed from the aforesaid coating composition are suited for outer walls and building exteriors.

That is, the present invention provides a coating composition for an outer wall or exterior of building, wherein the coating composition comprises the following components (A) to (D), (A) an emulsion of a silicone acrylic copolymer resin, wherein the silicone acrylic copolymer resin has a glass transition temperature of 0° C. or higher and is comprised of 60 to 99 parts by mass of (a1) a polyorganosiloxane represented by the following formula (1) and 1 to 40 parts by mass of (a2) an acrylic acid ester monomer and/or a methacrylic acid ester monomer, provided that a total amount of components (a1) and (a2) is 100 parts by mass,

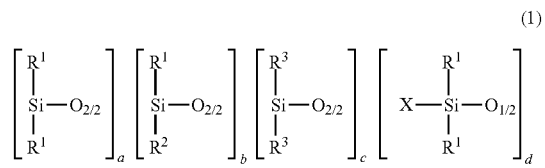

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group which has 1 to 6 carbon atoms and of which a part of the hydrogen atoms bonded to a carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the same silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; a, b, c and d are the number satisfying equations, $0.11 \le a/(a+b+c+d) < 1$, $0.00001 \le b/(a+b+c+d) \le 0.05$, $0 \le c/(a+b+c+d) \le 0.6$, and $0.000001 \le d/(a+b+c+d) \le 0.24$.

the emulsion being in an amount of 0.5 to 20 parts by mass as a solid content, (B) at least one resin emulsion in an amount of 20 to 80 parts by mass as a solid content, selected from the group consisting of an acrylic resin emulsion, an emulsion of a silicone acrylic resin other than component (A), a urethane resin emulsion, an alkyd resin emulsion, and an epoxy resin emulsion, (C) pigment in an amount of 1 to 50 parts by mass, and (D) a flame retardant in an amount of 1 to 10 parts by mass, provided that a total mass of the solid contents of components (A) and (B) and the amounts of components (C) and (D) is 100 parts by mass.

Effects of the Invention

The coating composition of the present invention forms a coating having excellent water repellency, water resistance, and stain resistance. The aforesaid coating gives a substrate excellent water repellency, water resistance, rain streak stain resistance, stain resistance, and weather resistance while maintaining the design specific to the substrate. The coating composition of the present invention is water-based and, therefore, advantageous from the standpoints of workability and environment. The water-based coating composition of the present invention is suited for outer walls and building exteriors.

DETAILED DESCRIPTION OF THE INVENTION

The components will be described below in detail.

(a) Emulsion of Silicone Acrylic Copolymer Resin

Component (A) is an emulsion of a silicone acrylic copolymer resin composed of 60 to 99 parts by mass of (a1) a polyorganosiloxane represented by the following formula (1) and 1 to 40 parts by mass of (a2) an acrylic acid ester monomer and/or a methacrylic acid ester monomer, provided that a total amount of components (a1) and (a2) is 100 parts by mass,

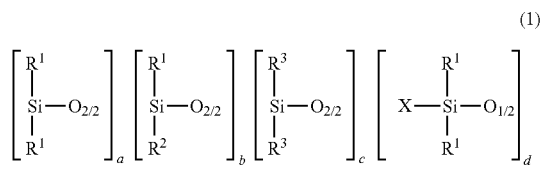

(1)

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group which has 1 to 6 carbon atoms and of which a part of the hydrogen atoms bonded to a carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the same silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; a, b, c and d are the number satisfying equations, $0.11 \le a/(a+b+c+d) < 1$, $0.00001\_b/(a+b+c+d) \le 0.05$, $0 \le c/(a+b+c+d) \le 0.6$, and $0.000001 \le d/(a+b+c+d) \le 0.24$.

More specifically, component (A) is an emulsion of a silicone acrylic copolymer resin obtained by the emulsion graft polymerization of the polyorganosiloxane (a1) represented by the above formula (1) and the acrylic acid ester monomer and/or methacrylic acid ester monomer (a2).

The mass ratio of the component (a1) and component (a2) is preferably such that the amount of component (a1) is 60 to 99 parts by mass and the amount of component (a2) is 1 to 40 parts by mass, relative to total 100 parts by mass of components (a1) and (a2). Further preferably, the amount of component (a1) is 70 to 95 parts by mass and the amount of component (a2) is 5 to 30 parts by mass.

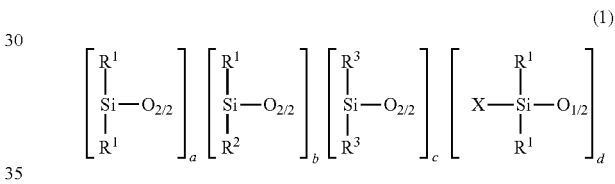

(1)

$R^1$ is, independently of each other, a substituted or unsubstituted, monovalent hydrocarbon group having 1 to 20, preferably 1 to 10, more preferably 1 to 6 carbon atoms. Examples of the monovalent hydrocarbon group include alkyl groups such as methyl, ethyl, propyl, butyl, pentyl, hexyl, heptyl, octyl, nonyl, decyl, dodecyl, tetradecyl, hexadecyl, and octadecyl groups; cycloalkyl groups such as cyclopentyl, cyclohexyl, and cycloheptyl groups; aryl groups such as tolyl and naphthyl groups; alkenylaryl groups such as a vinylphenyl group; aralkyl groups such as benzyl, phenylethyl, and phenylpropyl groups; and alkenylaralkyl groups such as vinylbenzyl and vinylphenylpropyl groups; and those groups in which a part or all of the hydrogen atoms are substituted with a halogen atom such as fluorine, bromine, or chlorine, a carboxyl group, an alkoxy group, an alkenyloxy group, or an amino group. $R^1$ is preferably an unsubstituted alkyl group having 1 to 6 carbon atoms, more preferably a methyl group.

$R^2$ is, independently of each other, an alkenyl group having 2 to 6 carbon atoms or an alkyl group which has 1 to 6 carbon atoms and of which a part of the hydrogen atoms bonded to a carbon atom is substituted with a mercapto group, a vinyl group, an acryloxy group, or a methacryloxy group. Examples of the alkenyl group having 2 to 6 carbon atoms include vinyl and allyl groups. $R^2$ is preferably an alkyl group having 1 to 6 carbon atoms and having an acryloxy or methacryloxy group. The aforesaid alkyl group is preferably a methyl group, an ethyl group, or a propyl group. $R^3$ is, independently of each other, a phenyl group or the aforesaid group defined for $R^1$. At least one of R's bonded to the same silicon atom is a phenyl group.

X is, independently of each other, a substituted or unsubstituted, monovalent hydrocarbon group having 1 to 20, preferably 1 to 10, more preferably 1 to 6 carbon atoms; an alkoxy group having 1 to 20, preferably 1 to 10, more preferably 1 to 4 carbon atoms; or a hydroxyl group. Examples of the substituted or unsubstituted monovalent hydrocarbon group having 1 to 20 carbon atoms include the aforesaid groups defined for $R^1$. Examples of the alkoxy group having 1 to 20 carbon atoms include methoxy, ethoxy, propoxy, butoxy, hexyloxy, heptyloxy, octyloxy, decyloxy, and tetradecyloxy groups. X is preferably hydroxyl, methyl, butyl, or phenyl groups.

In the formula (1), a, b, c, and d are the real number. "a" satisfies the following equation, $0.11 \le a/(a+b+c+d) \le 1$ (for example, 0.999999 or less), preferably $0.59 \le a/(a+b+c+d) \le 0.99998$. b satisfies the following equation, $0.00001 \le b/(a+b+c+d) \le 0.05$, preferably $0.00001 \le b/(a+b+c+d) \le 0.01$. c satisfies the following equation, $0 \le c/(a+b+c+d) \le 0.6$, preferably $0 \le c/(a+b+c+d) \le 0.30$. d satisfies the following equation, $0.000001 \le d/(a+b+c+d) \le 0.24$, preferably $0.00001 \le d/(a+b+c+d) \le 0.1$. If $b/(a+b+c+d)$ exceeds 0.05, the feel of a coated film is not improved and the stain resistance is worse. If $d/(a+b+c+d)$ exceeds 0.24, a weight average molecular is too small and the feel is not improved, which is not preferred. c is the number of the siloxane units having a phenyl group. On account of c being within the aforesaid range, the coating has preferable transparency and heat resistance.

The polyorganosiloxane (a1) has a weight average molecular weight of 5,000 to 500,000, preferably 8,000 to 450,000, more preferably 100,000 to 450,000, still more preferably 150,000 to 400,000. If the polyorganosiloxane has the aforesaid weight average molecular weight, a coating agent provides a good sliding property peculiar to silicones.

Here, the molecular weight of the polyorganosiloxane is calculated from the specific viscosity, ηsp, at 25° C. of a 1 g/100 ml solution of the polyorganosiloxane in toluene.

$\eta sp=(\eta/\eta 0)-1$ (η0: viscosity of toluene, η: viscosity of the solution)

$\eta sp=[\eta]+0.3[\eta]$ square $[\eta]=2.15 \times 10^{-4} M^{0.65}$

More specifically, 20 g of the emulsion is mixed with 20 g of IPA (isopropyl alcohol) to break the emulsion and, then, IPA is removed and a residual rubbery polyorganosiloxane is dried at 105° C. for 3 hours. The resulting polyorganosiloxane is dissolved in toluene in a concentration of 1 g/100 ml. A viscosity of the solution is determined at 25° C. by a Ubbelohde viscometer. The molecular weight is calculated by substituting the viscosity in the aforesaid equation (Reference: Nakamuta, Journal of the Chemical Society of Japan, 77, 858 [1956]; Doklady Akad. Nauk. U.S.S.R. 89 65 [1953]).

The aforesaid polyorganosiloxane (a1) is preferably in a form of an emulsion and may be a commercially available product or may be synthesized in house. The polyorganosiloxane (a1) may be easily synthesized in any known emulsion polymerization method. For example, a cyclic organosiloxane which may have a fluorine atom, a (meth)acryloxy group, a carboxyl group, a hydroxyl group, or an amino group, or an α,ω-dihydroxysiloxane oligomer, an α,ω-dialkoxysiloxane oligomer, or an alkoxysilane and a silane coupling agent represented by the following formula (2) are emulsified and dispersed in water with an anionic surfactant and, then, polymerized, if needed, in the presence of a catalyst such as an acid to obtain the polyorganosiloxane (a1).

$R^5{}_{(4-e-f)}R^6{}_f Si(OR^7)_e$ (2)

wherein $R^5$ is a monovalent organic group having a polymerizable double bond, specifically an alkyl group which has 1 to 6 carbon atoms and is substituted with an acryloxy or methacryloxy group; $R^1$ is an alkyl group having 1 to 4 carbon atoms; $R^7$ is an alkyl group having 1 to 4 carbon atoms; e is an integer of 2 or 3; f is an integer of 0 or 1; and e+f=2 or 3.

Examples of the aforesaid cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra(N-acryloyl-N-methyl-3-aminopropyl)tetramethylcyclotetrasiloxane, and 1,3,5,7-tetra(N,N-bis(lauroyl)-3-aminopropyl)tetramethylcyclotetrasiloxane.

Octamethylcyclotetrasiloxane and decamethylcyclopentasiloxane are preferred.

Examples of the silane coupling agent include acrylic silanes such as γ-(meth)acryloxypropyltrimethoxysilane, γ-(meth)acryloxypropyltriethoxysilane, γ-(meth)acryloxypropyltripropoxysilane, γ-(meth)acryloxypropyltriisopropoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxypropylmethyldiisopropoxysilane, and γ-(meth)acryloxypropylmethyldibutoxysilane; and mercaptosilanes such as γ-mercaptopropylmethyldimethoxysilane and γ-mercaptopropyltrimethoxysilane. Oligomers obtained by the condensation polymerization of the aforesaid silanes are sometimes preferred for decreasing the generation of an alcohol. In particular, acrylic silanes are preferred. The (meth)acryloxy herein means acryloxy or methacryloxy. These silane coupling agents are preferably used in an amount of 0.01 to 10 parts by mass, more preferably 0.01 to 5 parts by mass, relative to 100 parts by mass of the cyclic organosiloxane. If the amount is less than 0.01 part by mass, the transparency of the coating agent thus obtained is lower. If the amount is more than 10 parts by mass, the coating agent may not have a sliding property.

On account of copolymerizing the cyclic organosiloxane with the aforesaid silane coupling agent, a polymerizable group ($R^2$) is introduced onto the polyorganosiloxane and, thereby, the (meth)acrylic acid ester monomer (a2) may be grafted on the polyorganosiloxane (a1).

The polymerization catalyst used for the polymerization may be any known polymerization catalysts. Among them, strong acids are preferred such as hydrochloric acid, sulfuric acid, dodecylbenzenesulfonic acid, citric acid, lactic acid, and ascorbic acid. Dodecylbenzenesulfonic acid has an emulsifying ability and is preferred.

The acid catalyst is preferably used in an amount of 0.01 to 10 parts by mass, more preferably 0.2 to 2 parts by mass, relative to 100 parts by mass of the cyclic organosiloxane.

Examples of the surfactant to be used in the polymerization include anionic surfactants such as sodium lauryl sulfate, sodium laurate sulfate, N-acylamino acid salts, N-acyl taurine salts, aliphatic soaps, and alkyl phosphates. Preferred are anionic surfactants which are easily soluble in water and have no polyethylene oxide chain. More preferred are N-acylamino acid salts, N-acyl taurine salts, aliphatic soaps, and alkyl phosphates, and particularly preferred are sodium methyl lauroyl taurate, sodium methyl myristoyl taurate, and sodium lauryl sulfate.

The anionic surfactant is preferably used in an amount of 0.1 to 20 parts by mass, more preferably 0.5 to 10 parts by mass, relative to 100 parts by mass of the cyclic organosiloxane.

The polymerization temperature is preferably 50 to 75° C. and the polymerization time is preferably 10 hours or more, more preferably 15 hours or more. Further, the polymerization is preferably followed by aging at 5 to 30° C. for 10 hours or more.

The acrylic acid ester or methacrylic acid ester (a2) (hereinafter, referred to as "acrylic component") is a linear or branched alkyl ester having 1 to 20 carbon atoms, preferably 1 to 6 carbon atoms, more preferably 1 to 3 carbon atoms; and may have a functional group such as an amide, vinyl, carboxyl, or hydroxyl group. Examples of the acrylic acid ester and methacrylic acid ester include methyl acrylate, ethyl acrylate, butyl acrylate, 2-ethylhexyl acrylate, methyl methacrylate, ethyl methacrylate, butyl methacrylate, and 2-ethylhexyl methacrylate. One or more of these esters may be copolymerized. Methyl acrylate, ethyl acrylate, methyl methacrylate, or ethyl methacrylate is preferred. The acrylic acid ester or methacrylic acid ester may preferably have a glass transition temperature (hereinafter, referred to as "Tg") of 120° C. or below, more preferably 110° C. or less. The lower limit is preferably −50° C. Component (a2) is selected for the graft copolymerization so as to provide a silicone acrylic copolymer resin having a Tg of 0° C. or higher, more preferably 5° C. or higher. On account of the silicone acrylic resin having the aforesaid Tg, the stain-proofing property of a resin obtained is increased.

The aforesaid graft copolymerization of the polyorganosiloxane (a1) and the (meth)acrylic acid ester monomer (a2) may be conducted according to any conventional method. For example, a radical initiator may be used. The radical initiator is not particularly limited. Examples of the radical initiator include persulfates such as potassium persulfate and ammonium persulfate, aqueous hydrogen persulfate, t-butyl hydroperoxide, and hydrogen peroxide. A redox system with a reducing agent such as sodium bisulfite, Rongalite, L-ascorbic acid, tartaric acid, saccharides, and amines may be used in combination with the aforesaid radical initiator if necessary.

An anionic surfactant such as sodium lauryl sulfate, sodium laureth sulfate, N-acylamino acid salt, N-acyl taurine salt, aliphatic soap, or an alkyl phosphate may be added in order to improve the stability of the emulsion. A nonionic emulsifier such as polyoxyethylene lauryl ether or polyoxyethylene tridecyl ether may also be added.

Further, a chain transfer agent may be added to control the molecular weight.

The silicone acrylic copolymer resin emulsion (A) preferably has a solid content of 35 to 50 mass % and a viscosity (25° C.) of 500 mPa·s or less, more preferably 20 to 300 mPa·s. The viscosity may be determined with a rotational viscometer. The emulsion particles have an average particle diameter of 1000 nm or less, preferably 100 nm to 500 nm, more preferably 150 to 350 nm. If the average particle diameter is too large, whitening is observed. If the average particle diameter is too small, dispersibility is lower. The particle diameter of the resin emulsion is determined by JEM-2100™, ex JEOL.

The solid content of the silicone acrylic copolymer resin emulsion (A) is preferably 0.5 to parts by mass, more preferably 1.5 to 15 parts by mass, still more preferably 2 to 10 parts by mass, relative to total 100 parts by mass of the solid content of component (A), the solid content of component (B), component (C), and component (D). If the solid content of component (A) is less than the aforesaid lower limit, feel or stain resistance is not sufficient. If the solid content of component (A) is more than the aforesaid upper limit, the surface of the coating film is easily stained. The solid content of component (A) in the coating composition is preferably 0.1 to 9 mass %, preferably 0.5 to 7 mass %. The silicone acrylic copolymer resin (A) preferably has a glass transition temperature (hereinafter, referred to as "Tg") of 0° C. or higher, more preferably 5° C. or higher.

The glass transition temperature (T) of the polymer resin is calculated according to the following equation:

$$(Pa+Pb+Pc)/T=(Pa/Ta)+(Pb/Tb)+(Pc/Tc)$$

In the above equation, T is a glass transition temperature (K) of polymer particles, Pa, Pb, and Pc are contents (mass %6) of the monomers a, b, and c, respectively, and Ta, Tb, and Tc are glass transition temperatures (K) of the monomers a, b, and c, respectively. The glass transition temperature is determined according to JIS K 7121.

If the other monomer is added, the aforesaid equation may also be applied. The glass transition temperature of the resin emulsion (B) may be calculated according to the aforesaid equation.

(B) Resin Emulsion

Component (B) is at least one resin emulsion selected from at least one resin emulsion selected from the group consisting of acrylic resin emulsions or acrylic silicone resin emulsions other than component (A), urethane resin emulsions, alkyd resin emulsions, and epoxy resin emulsions. More specifically, component (B) is an acrylic resin emulsion comprising a (meth)acrylic monomer such as (meth)acrylic acid or (meth)acrylic acid ester, an acrylic silicone resin emulsion, an urethane resin emulsion, or an alkyd resin emulsion. Preferably, it has a film-forming ability. The film-forming ability is an ability of forming a film whose surface does not have particle-like unevenness at a predetermined temperature or higher after drying and which does not cause small cracks during drying. A drying temperature range for the formation of the film (MFT) is not particularly limited. The hardness of the film formed by drying the resin emulsion (B) is not particularly limited and the film preferably has a pencil hardness of 2B to 2H, as determined according to JIS K5400-5-4.

The particles in the resin emulsion (B) preferably have an average particle diameter of 20 nm to 1000 nm, more preferably 20 nm to 500 nm, still more preferably 20 nm to 350 nm. The particle diameter of the resin emulsion is determined with JEM-2100™, ex JOEL.

The acrylic resin emulsion may be one obtained by any known method, for example, emulsion polymerization using an anionic or nonionic emulsifier, or may be a commercially available one.

Examples of the (meth)acrylic monomer include methyl acrylate, ethyl acrylate, butyl acrylate, 2-ethylhexyl acrylate, methyl methacrylate, acrylic acid, methacrylic acid, and crotonic acid. A glass transition temperature (hereinafter, referred to as "Tg") of the (meth)acrylic monomer is 120° C.

or lower, preferably 60° C. or lower, more preferably 30° C. or lower. The lower limit of the glass transition temperature is preferably −50° C.

Examples of the commercially available acrylic resin emulsion include VINYBRAN, ex Nisshin Chemical, Yodosol, ex. Henkel Japan, and Aron, ex Toagosei.

The acrylic silicone resin emulsion in component (B) is different from the aforesaid silicone acrylic copolymer resin emulsion (A) wherein the resin is composed of a main acrylic component and a silicone component block-polymerized or graft-polymerized on the main acrylic component. Examples of commercially available acrylic silicone resin emulsions include Ceranate WSA-1070 (ex DIC Corporation) and Polydurex series (ex Asahi Kasei Corporation).

The urethane resin emulsion may be synthesized by any known method, for example, by emulsion polymerization using an anionic or nonionic emulsifier or a commercially available one.

Examples of the urethane resin emulsion include emulsions of various water-soluble urethane resins which are a product of obtained by reacting polyisocyanate with a polyol such as polyether, polycarbonate, or polyester. The urethane resin emulsion preferably has a particle diameter of 10 to 500 nm so as to have a film-forming ability and preferably has a viscosity (25° C.) of 10 to 500 mPa·s. The glass transition temperature (hereinafter, referred to as "Tg") is 120° C. or lower, preferably 60° C. or lower, more preferably 30° C. or lower. The lower limit of the glass transition temperature is preferably −50° C. The glass transition temperature is determined according to JIS K7121.

Examples of the commercially-available, polyether-based urethane resin emulsion include Adeka Bontighter HUX-350, ex Adeka Corporation, WLS-201 and WLS-202, all ex DIC Corporation, and Superflex E-4000 and E-4800, all ex DKS Co. Ltd. Examples of the polycarbonate-based urethane resin emulsion include Hydran WLS-210 and WLS-213, all ex DIC corporation, UW-1005E and UW-5502, all ex Ube Industries Ltd., Permarin UA-368, ex Sanyo Chemical, Ltd., and Superflex 460 and Superflex 470, ex DKS Co., Ltd. Examples of the polyester-based urethane resin emulsion include Adeka Bontighter HUX-380 and HUX-540, all ex Adeka Corporation and Superflex 420 and Superflex 860, all ex DKS Co., Ltd.

The alkyd resin emulsion is obtained, for example, by a method of neutralizing an alkyd resin having a high acid value with a basic compound such as amine compound to obtain an aqueous emulsion; a method of introducing a hydrophilic group such as polyoxyethylene group into an alkyd resin to cause the alkyd resin to self-emulsify in water on account of the hydrophilic group; a method of forcibly vigorously stirring an alkyd resin to disperse in water in the presence of an emulsifying agent by a high-speed stirrer such as disper stirrer, or a method of stirring an alkyd resin having a low acid value by a high-speed stirrer to obtain alkyd resin particles having a water dispersibility and treating the particles by a disperser having a specific high-energy shearing ability for atomization to atomize in order to enhance the water dispersibility and to make the particle diameters smaller and more uniform; and combination of these methods. Alternatively, a commercially available product may be used.

Examples of the commercially available alkyd resin emulsion include Watersol series, ex DIC corporation.

The water-based epoxy resin emulsion may be of a one-component type or a two-component type. Examples of the water-based epoxy resin emulsion include W2821R[70] (ex Mitsubishi Chemical Corporation, epoxy equivalent is 68 to 72).

The amount of the resin emulsion (B) is, as a solid content, 20 to 80 parts by mass, preferably 30 to 78 parts by mass, more preferably 40 to 75 parts by mass, relative to total 100 parts by mass of the solid content of component (A), the solid content of component (B), component (C), and component (D). The coating composition may comprise the resin emulsion in a solid content of 10 to 35 mass %, preferably 15 to 32 mass %. If the amount (solid content) of the resin emulsion is less than the aforesaid lower limit, film properties such as abrasion resistance may be significantly worse. If the amount of the resin emulsion is more than the aforesaid upper limit, the feel is worse.

(C) Pigment

The pigment (C) may be any known pigment to be incorporated in a coating composition and may be either an inorganic pigment or an organic pigment. Examples of the inorganic pigment include titanium oxide, red iron oxide (blood red), yellow iron oxide, black iron oxide, Prussian blue, zinc oxide, cobalt blue, emerald green, viridian, and titanium white. Examples of the organic pigment include alkali blue, lithol red, carmine 6B, disazo yellow, phthalocyanine blue, quinacridone red, and isoindoline yellow.

The average particle diameter of the pigment (C) is not particularly limited and is preferably 5 nm to 10 μm, more preferably 10 nm to 5 μm. The average particle diameter of the pigment is a volume average particle diameter determined by a laser diffraction particle size analyzer.

The amount of the pigment (C) is 1 to 50 parts by mass, preferably 5 to 35 parts by mass, relative to total 100 parts by mass of the solid content of component (A), the solid content of component (B), and components (C) and (D). The coating composition may comprise 0.1 to 25 mass %, preferably 0.5 to 20 mass %, of the pigment. If the amount of the pigment is less than the aforesaid lower limit, a hiding property is poor, so that design may not be changed. If the amount of the pigment is more than the aforesaid upper limit, dispersibility is poor, so that aggregation occurs in coating, which is not preferred.

(D) Flame Retardant

The flame retardant (D) may be any conventional one to be incorporated in coating compositions and may be, for example, an inorganic component improving flame-retardancy. Examples of such include phosphorus compounds (triphenyl phosphate, tricresyl phosphate, trixylenyl phosphate, tris(β-chloropropyl) phosphate, tris(dichloropropyl) phosphate, condensed phosphoric acid ester, and ammonium polyphosphate), hydrated metal compounds such as aluminum hydroxide and magnesium hydroxide, zinc borate, molybdenum compounds (molybdenum trioxide), and antimony compounds (antimony oxide, antimony pentoxide, and sodium antimonate).

The amount of the flame retardant (D) is 1 to 10 parts by mass, more preferably 1 to 5 parts by mass, relative to total 100 parts by mass of the solid content of component (A), the solid content of component (B), and components (C) and (D). The coating composition may comprise 0.1 to 5 mass %, preferably 0.5 to 2 mass % of the flame retardant, relative to total mass of the coating composition. If the amount is less than the aforesaid lower limit or more than the aforesaid upper limit, stain resistance and weather resistance may be worse. The average particle diameter of the flame retardant is preferably 0.5 to 20 μm. The average particle diameter is a volume average particle diameter, as determined by a laser diffraction particle size analyzer.

(E) Matting Agent

The coating composition of the present invention may further comprise (E) matting agent. The matting agent (E) may be any conventional one to be incorporated in coating compositions. Examples of the matting agent include silica, crosslinking-type acrylic resins, and crosslinking-type urethane resins. The coating film may have a matte or semigloss appearance by adjusting the amount or kind of the matting agent.

The average particle diameter of the matting agent (E) is not particularly limited and is preferably 0.5 µm to 30 µm, more preferably 1 µm to 15 µm. The average particle diameter of the matting agent is a volume average particle diameter, as determined by a laser diffraction particle size analyzer.

The amount of the matting agent (E) is preferably 0.5 to 20 mass %, more preferably 1 to mass %, still more preferably 2 to 10 mass/o, relative to a total mass of the coating composition. If the amount of the matting agent is less than the lower limit, the matting effect may not be obtained at all. If the amount is more than the aforesaid upper limit, the resulting coating composition may be whitened.

The coating composition of the present invention is prepared by mixing the silicone acrylic copolymer resin emulsion (A), the resin emulsion (B), the pigment (C) dispersed in water in advance, the flame retardant (D) and, if needed, the matting agent (E) dispersed in water in advance, by a known mixing method in an aqueous system with a propeller type stirrer, homogenizer, ball mill, beads mill, or disperser mixer.

For example, component (A), the aqueous dispersion of component (C), and the aqueous dispersion of components (D) and (E) are poured in component (B) under stirring at 500 rpm by a disperser mixer, followed by stirring at 1000 rpm for 30 minutes to obtain the coating composition of the present invention.

A range of a drying temperature (MFT) for forming a coating of the coating composition is not particularly limited and is preferably 30° C. or lower. The hardness of the coating is not particularly limited, but preferably a pencil hardness of 2B to 4H, more preferably 2B to 2H. The hardness is determined according to JIS K5400-5-4.

The coating composition of the present invention may further comprise an antioxidant, an ultraviolet absorber, an antifreezing agent, a pH regulator, an antiseptic, an antifoaming agent, an anti-fungus agent, a mildew-proofing agent, a light stabilizer, an antistatic, a plasticizer, a flame retardant, a thickener, a surfactant, an organic solvent such as film-forming aid, and other resins.

A coating is formed by applying the present coating composition for outer wall or exterior of building on one or both surfaces of a substrate such as a ceramic building material as a siding board, concrete, wood substrate, a metal substrate and a mortar substrate or by dipping a substrate in the present coating composition; and, then, drying the coating composition at room temperature to 150° C. The coating formed from the present coating composition gives the advantages of a silicone resin such as water repellency, weather resistance, heat resistance, cold resistance, gas permeability, and sliding properties to the substrate for a long period of time, while maintaining the merits of the substrate. These effects may be obtained by a strong sea-island morphology formed by the resin (B) having a film-forming ability and the curable silicone resin (A).

Examples of the ceramic building material include a siding board.

Examples of the wood substrate include lumbers of the family Aceraceae, Betulaceae, Lauraceae, Castanea, Scrophulariaceae, Araucaria, Ulmaceae, Bignoniaceae, Rosaceae, Cupressaceae, Dipterocarpaceae, Myrtaceae, Fagaceae, Pinaceae, Leguminosae, and Oleaceae. The wood substrate is preferably dried by hot air at 20 to 150° C., particularly 50 to 150° C., for 0.5 to 5 hours. If the drying temperature is adjusted to 120° C. or lower, discoloration of the coating may be avoided.

Examples of the metal as the substrate include Si, Cu, Fe, Ni, Co, Au, Ag, Ti, Al, Zn, Sn, and Zr, and alloys thereof.

The method of applying the coating composition of the present invention on the substrate is not particularly limited and includes coating methods with various coaters such as gravure coater, bar coater, blade coater, roll coater, air knife coater, screen coater, and curtain coater, spray coating, dipping, and brushing.

The coating amount of the coating composition is not particularly limited. From the standpoint of stain resistance and coating workability, usually, the coating composition may preferably be applied in a coating amount of 1 to 300 g/m$^2$, more preferably 5 to 100 g/m$^2$ as a solid content, or at a dry coating thickness of 1 to 500 µm, preferably 5 to 100 µm. Then, the composition is preferably naturally dried or heat-dried at 100 to 200° C. to form a film.

The coating composition of the present invention is applied to an outer wall or as building exterior material to, thereby, give excellent water repellency, water resistance, and stain resistance to the substrate. An article comprising a coating formed from the aforesaid coating composition has excellent water repellency, water resistance, rain streak stain resistance, stain resistance, and weather resistance, while maintaining the original design of the substrate.

EXAMPLES

The present invention will be explained below in further detail with reference to a series of the Examples and the Comparative Examples, though the present invention is in no way limited by these Examples.

Hereinafter, "part" or "%" represents part by mass or mass %, respectively. The weight average molecular weight was calculated from a specific viscosity, ηsp, at 25° C. of a 1 g/100 ml solution in toluene of the polyorganosiloxane by the aforesaid method. The particle diameter of the resin emulsions obtained in the following Preparation Examples and Comparative Preparation Examples was determined by JEM-2100™, ex JEOL.

<Method of Determining a Glass Transition Temperature Tg>

The glass transition temperature Tg was determined by applying a load of 5 kgf to about 1 g of silicone acrylic copolymer resin powder obtained by spray drying. and elevating a temperature at 5° C./min by a flow tester ex. Shimadzu Corporation.

Determination of a Solid Content

Approximately 1 g of each of the resin emulsion (sample) was placed in an aluminum foil dish and accurately weighed, placed in a dryer kept at about 105° C., left for 1 hour, taken out from the dryer, allowed to cool in a desiccator, and then weighed. A solid content was calculated by the following formula.

$$R = \frac{T-L}{W-L} \times 100$$

R: Solid content in %
W: Mass in gram of the aluminum foil dish and the undried sample
L: Mass in gram of the aluminum foil dish
T: Mass in gram of the aluminum foil dish and the dried sample Preparation of the Silicone Acrylic Copolymer Resin Emulsion (A)

Preparation Example 1

600 Grams of octamethylcyclotetrasiloxane, 0.48 g of γ-methacryloxypropyl methyldiethoxysilane, a solution of 6 g of sodium lauryl sulfate in 54 g of pure water and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate.

The structure of the polyorganosiloxane obtained by the polymerization was confirmed by ¹H-NMR and ²⁹Si-NMR (JNM-ECA600, determination solvent: CDCl₃; ¹H: frequency: 600 MHz, room temperature, integration times: 128; and ²⁹Si: frequency: 600 MHz, room temperature, integration times: 5000). The polyorganosiloxane was represented by the following formula (1-1) and had an Mw (weight average molecular weight determined by the aforesaid method) of 250,000.

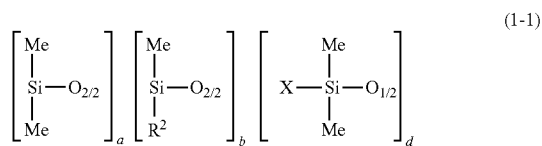

(1-1)

wherein R² is a γ-methacryloxypropyl group and X is a hydroxyl or ethoxy group and the proportions of a, b and d are shown in Table 1.

To the aforesaid neutralized reaction mixture (containing 534 g of the polyorganosiloxane obtained above), 232 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.2%. The average particle diameter and solid content of the silicone acrylic copolymer resin emulsion are shown in Table 2.

Preparation Example 2

600 Grams of octamethylcyclotetrasiloxane, 0.60 g of γ-methacryloxypropyl methyldiethoxysilane, a solution of 6 g of sodium lauryl sulfate in 54 g of pure water and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 55° C. for 24 hours, followed by aging at 5° C. for 24 hours and neutralization around a neutral point with 12 g of a 10% aqueous solution of sodium carbonate.

The structure of the polyorganosiloxane obtained by the polymerization was confirmed by ¹H-NMR (JNM-ECA600, determination solvent: CDCl₃, determination conditions are same as those in Preparation Example 1). It was confirmed that the polyorganosiloxane was represented by the aforesaid formula (1-1) and had an Mw (weight average molecular weight determined by the aforesaid method) of 400,000.

In the aforesaid formula (1-1), R² is a γ-methacryloxypropyl group and X is a hydroxyl or ethoxy group. The proportions of a, b and d are shown in Table 1.

To the aforesaid neutralized reaction mixture (containing 534 g of the polyorganosiloxane obtained above), 61 g of methyl methacrylate (MMA) was added dropwise over a period of 3 to hours under a redox reaction between a peroxide and a reducing agent at 30° C. to proceed acrylic copolymerization with the polyorganosiloxane to obtain a silicone acrylic copolymer resin emulsion having a solid content of 44.8%. The average particle diameter and solid content of the silicone acrylic copolymer resin emulsion are shown in Table 2.

Preparation Example 3

300 Grams of octamethylcyclotetrasiloxane, 300 g of diphenyldimethylsiloxane (KF-54, ex Shin-Etsu Chemical Co., Ltd), 0.96 g of γ-methacryloxypropyl methyldiethoxysilane, a solution obtained by diluting 24 g of 50% sodium alkyl diphenyl ether disulfonate (Pelex SS-L, ex Kao Corporation) with 45 g of pure water, and a solution of 6 g of dodecylbenzene sulfonate in 54 g of pure water were placed in a 2 L beaker made of polyethylene, and uniformly emulsified by a homomixer, which was then diluted by adding 490 g of water little by little, and passed through a high-pressure homogenizer at a pressure of 300 kgf/cm² twice to obtain a uniform milky-white emulsion. The emulsion was transferred to a 2 L glass flask equipped with a stirrer, a thermometer and a reflux condenser, and allowed to polymerize at 55° C. for 10 to 20 hours, followed by aging at 10° C. for 10 to 20 hours and neutralization around a neutral point with 12 g of a 10% aqueous solution of sodium carbonate.

The structure of the polyorganosiloxane obtained by the polymerization was confirmed by ¹H-NMR (JNM-ECA600, determination solvent: CDCl₃, determination conditions are same as those in Preparation Example 1). It was confirmed that the polyorganosiloxane was represented by the following formula (1-2) and had an Mw (weight average molecular weight determined by the aforesaid method) of 8,000.

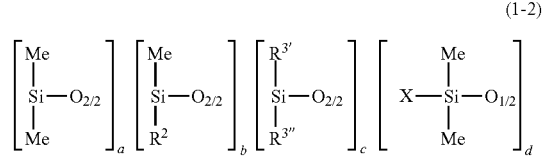

(1-2)

wherein $R^2$ is a γ-methacryloxypropyl group, $R^{3\prime}$ and $R^{3\prime\prime}$ are a phenyl or methyl group, at least one of $R^{3\prime}$ and $R^{3\prime\prime}$ is a phenyl group, and X is a hydroxyl or ethoxy group and the proportions of a, b, c and d are shown in Table 1.

The emulsion obtained by the aforesaid neutralization had a nonvolatile content (solid content) of 47.5% after drying at 105° C. for 3 hours.

To the aforesaid neutralized reaction mixture (containing 534 g of the polyorganosiloxane obtained above), 242 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.5%. The average particle diameter and solid content of the silicone acrylic copolymer resin emulsion are shown in Table 2.

Preparation Example 4

The procedures of Preparation Example 1 were repeated to obtain a uniform milky-white emulsion. As in Preparation Example 1, the emulsion was transferred to a 2 L glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. It was confirmed that the polyorganosiloxane was represented by the aforesaid formula (1-1) and had an Mw (weight average molecular weight determined by the aforesaid method) of 250,000.

To the aforesaid neutralized reaction mixture (containing 534 g of the polyorganosiloxane obtained above), 162 g of butyl acrylate (BA) and 80 g of methyl methacrylate (MMA) were added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 44.9%. The average particle diameter and solid content of the silicone acrylic copolymer resin emulsion are shown in Table 2.

Comparative Preparation Example 1

The procedures of Preparation Example 1 were repeated to obtain a uniform milky-white emulsion. As in Preparation Example 1, the emulsion was transferred to a 2 L glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. It was confirmed that the polyorganosiloxane was represented by the aforesaid formula (1-1) and had an Mw (weight average molecular weight determined by the aforesaid method) of 250,000.

To the aforesaid neutralized reaction mixture (containing 534 g of the polyorganosiloxane obtained above), 541 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.5%. The average particle diameter and solid content of the silicone acrylic copolymer resin emulsion are shown in Table 2.

Comparative Preparation Example 2

The procedures of Preparation Example 1 were repeated to obtain a uniform milky-white emulsion. As in Preparation Example 1, the emulsion was transferred to a 2 L glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. It was confirmed that the polyorganosiloxane was represented by the aforesaid formula (1-1) and had an Mw (weight average molecular weight determined by the aforesaid method) of 250,000.

The polyorganosiloxane was not subjected to acrylic copolymerization and the preparation was completed. The silicone resin emulsion obtained had a nonvolatile content of 44.8%. The average particle diameter and solid content of the silicone resin emulsion are shown in Table 2.

Comparative Preparation Example 3

552 Grams of octamethylcyclotetrasiloxane, 48 g of γ-methacryloxypropyl methyldiethoxysilane, and a solution of 6 g of sodium lauryl sulfate in 54 g of pure water and a solution of 6 g of dodecylbenzene sulfonate in 54 g of pure water were placed in a 2 L beaker made of polyethylene, and uniformly emulsified by a homomixer, which was then diluted by adding 470 g of water little by little, and passed through a high-pressure homogenizer at a pressure of 300 kgf/cm$^2$ twice to obtain a uniform milky-white emulsion. The emulsion was transferred to a 2 L glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate.

The structure of the polyorganosiloxane obtained by the polymerization was confirmed by 1H-NMR (JNM-ECA600, determination solvent: CDCl$_3$, determination conditions are same as those in Preparation Example 1). It was confirmed that the polyorganosiloxane was represented by the following formula (1-3) and had an Mw (weight average molecular weight determined by the GPC) of 250,000.

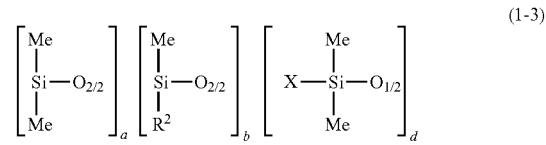

(1-3)

wherein $R^2$ is a γ-methacryloxypropyl group and X is a hydroxyl or ethoxy group and the proportions of a, b and d are shown in Table 1.

To the aforesaid neutralized reaction mixture (containing 534 g of the polyorganosiloxane obtained above), 232 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.0%. The average particle diameter and solid content of the silicone acrylic copolymer resin emulsion are shown in Table 2.

Comparative Preparation Example 4

The procedures of Preparation Example 3 were repeated to obtain a uniform milky-white emulsion. As in Preparation Example 3, the emulsion was transferred to a 2 L glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. It was confirmed that the polyorganosiloxane was represented by the aforesaid formula (1-3) and had an Mw (weight average molecular weight determined by the aforesaid method) of 250,000.

To the aforesaid neutralized reaction mixture (containing 534 g of the polyorganosiloxane obtained above), 232 g of n-butyl acrylate (BA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.1%. The average particle diameter and solid content of the silicone acrylic copolymer resin emulsion are shown in Table 2.

parts of propylene glycol, 500 parts of titanium oxide (C) (Tipaque CR-95 (ex Ishihara Sangyo Kaisha, Ltd., Rutile type titanium oxide having an average particle diameter of 0.28 µm), and 100 parts of glass beads (diameter: 1 mm) were stirred and dispersed with a homodisper at a rotation speed of 3000 rpm for 60 minutes, and then filtered through a 100-mesh metal screen to obtain an while paste.

Production Example 2

Preparation of an Aqueous Dispersion Containing the Flame Retardant (D) and the Matting Agent (E)

80 Parts of ion-exchanged water, 10 parts of ALH-3 L (heat-resistant aluminum hydroxide, ex Kawai Lime Industry Co., Ltd., average particle diameter: 4.5 µm, 1% thermal decomposition temperature: 280° C.) as the flame retardant (D), and 10 parts of Silysia 550 (colloidal silica, ex Fuji Silysia Chemical Ltd., average particle diameter: 4 µm, pore volume: 0.8 ml/g) as the matting agent (E) were mixed and

TABLE 1

| | Preparation Example | | | | Comparative Preparation Example | | | |
|---|---|---|---|---|---|---|---|---|
| | 1 | 2 | 3 | 4 | 1 | 2 | 3 | 4 |
| Mass proportion of the raw materials for polyorganosiloxane (a1) | | | | | | | | |
| D4 | 100 | 100 | 50 | 100 | 100 | 100 | 100 | 100 |
| KF-54 | 0 | 0 | 50 | 0 | 0 | 0 | 0 | 0 |
| sodium lauryl sulfate | 1 | 1 | | 1 | 1 | 1 | 1 | 1 |
| Pelex SS-L | | | 2 | | | | | |
| dodecylbenzene sulfonate | 1 | 1 | 1 | 1 | 1 | 1 | 1 | 1 |
| γ-methacryloxypropyl methyldiethoxysilane | 0.08 | 0.1 | 0.16 | 0.08 | 0.08 | 0.08 | 8.7 | 8.7 |
| Proportions of a to d in polyorganosiloxane (a1), based on a total 100 of a to d. | | | | | | | | |
| a | 99.91 | 99.93 | 67.22 | 99.91 | 99.91 | 99.91 | 93.94 | 93.94 |
| b | 0.03 | 0.03 | 0.48 | 0.03 | 0.03 | 0.03 | 6 | 6 |
| c | 0 | 0 | 28.5 | 0 | 0 | 0 | 0 | 0 |
| d | 0.06 | 0.04 | 3.8 | 0.06 | 0.06 | 0.06 | 0.06 | 0.06 |

D4: octamethyl cyclotetrasiloxane
KF-54: diphenyl dimethyl siloxane
Pelex SS-L: 50% sodium alkyl diphenyl ether disulfonate

TABLE 2

| | Preparation Example | | | | Comparative Preparation Example | | | |
|---|---|---|---|---|---|---|---|---|
| | 1 | 2 | 3 | 4 | 1 | 2 | 3 | 4 |
| (a1) Polyorganosiloxane | 70 | 90 | 70 | 70 | 50 | 100 | 70 | 70 |
| (a2) Methyl methacrylate | 30 | 10 | 30 | 20 | 50 | 0 | 30 | |
| (a2) Butyl acrylate | | | | 10 | | | | 30 |
| Tg (° C.) | 110 | 100 | 110 | 30 | 105 | | 110 | <0° C. Not detected |
| Av. particle diameter, nm | 240 | 230 | 240 | 230 | 240 | | 220 | 240 |
| Solid content, % | 45.2 | 45.0 | 45.3 | 44.9 | 45.5 | | 45.0 | 45.1 |

Production Example 1

Preparation of an Aqueous Dispersion Containing the Pigment (C)

112 Parts of ion-exchanged water, 30 parts of Demol EP (polycarboxylic acid-based surfactant having a high molecular weight, ex Kao Corporation), 50 parts of Discoat N-14 (aqueous dispersion of an ammonium salt of a styrene-maleic acid monoester copolymer, ex DKS Co., Ltd.), 25 stirred with a disper mixer at 1000 rpm for 20 minutes to obtain an aqueous dispersion.

Production Example 3

Preparation of an Aqueous Dispersion Containing the Flame Retardant (D)

80 Parts of ion-exchanged water and 20 parts of ALH-3 L (heat-resistant aluminum hydroxide, ex Kawai Lime Industry Co., Ltd., average particle diameter: 4.5 µm, 1% thermal decomposition temperature: 280° C.) as the flame retardant (D) were mixed and stirred with a disper mixer at 1000 rpm for 20 minutes to obtain an aqueous dispersion.

Production Example 4

Preparation of an Aqueous Dispersion Containing the Matting Agent (E)

80 Parts of ion-exchanged water and 20 parts of Silysia 550 (colloidal silica, ex Fuji Silysia Chemical Ltd., average particle diameter: 4 μm, pore volume: 0.8 ml/g) as the matting agent (E) were mixed and stirred with a disper mixer at 1000 rpm for 20 minutes to obtain an aqueous dispersion.

The following are resin emulsions (B) used in the following Examples and Comparative Examples.
- Aron A-104 (aqueous acrylic resin emulsion, ex Toagosei Co., Ltd., solid content: 40%)
- Hydran WLF-213 (polyurethane dispersion, ex DIC Corporation, solid content: 35%, average molecular weight: 150,000)
- Watersol BCD-3100 (aqueous solution of polyester/alkyd resin, ex DIC Corporation, solid content: 43%)

Example 1

"Aron A-104" (trade name, viscosity: 300 to 1000 mPa·s, ex Toagosei Co., Ltd.) was used as the aqueous acrylic resin emulsion (B). According to the amounts shown in the following Table 3, the silicone acrylic copolymer resin emulsion (A) obtained in Preparation Example 1, the white paste obtained in Production Example 1, and the aqueous dispersion obtained in Production Example 2 were added to the aqueous resin emulsion under stirring. Ion-exchanged water was then added to adjust the solid content and the resulting mixture was stirred in a ball mill for 2 hours. The balls were filtered off by a 100-mesh screen to obtain an water-based coating composition. The solid content in the water-based coating composition was about 35%. The water-based coating composition thus obtained was applied on mortar by the following method to form a coating.

Examples 2 to 8 and Comparative Examples 1 to 11

The procedures in Example 1 were repeated, except that the composition was changed to those shown in the following Table 3 or 4, to thereby obtain aqueous coating compositions. The amount of the components was adjusted to give a solid content of about 40% in each of the coating compositions. The water-based coating compositions thus obtained were each applied on mortar by the following method to form a coating.

Method for Coating

The coating compositions thus obtained were each applied with a brush on a mortar test specimen (ISO 25×12×75) in an amount of giving a dry coating thickness of 50 μm and, then, left to stand at room temperature for 72 hours to form dried coatings.

Water repellency, a crayon removal property, weather resistance, and rain streak stain resistance of the coatings thus obtained were evaluated by the following methods.

Water Contact Angle

On the coating film, a droplet of 0.2μ of ion-exchanged water was contacted. After thirty seconds, the contact angle of the droplet was determined by an automatic contact angle meter DMO-601 (ex Kyowa Interface Science Co., Ltd.).

Stain Resistance (Easy Removing of an Image Drawn by Crayon)

A section having an area of 5 mm×2 cm of the coatings was blot out with a crayon and dried at room temperature for 5 minutes. The section was rubbed repeatedly with tissue paper moistened with water. When 70% or more of the area of the section was cleaned up, stain resistant was evaluated as A. When it was 10 to 30% of the area, stain resistant was evaluated as B. When less than 10% of the area was cleaned up, stain resistant was evaluated as C. The evaluation results are as shown in the following Tables.

Weather Resistance Test

The aforesaid film was subjected to accelerated weather resistance test for 500 hours under the conditions according to JIS A5759:2008 in a sunshine carbon are weather-meter according to JIS B7753:2007.

When all of the test specimens from the specific film had no change in the appearance, for example, blisters, cracks, or peels, the film was evaluated as Excellent "E". Otherwise, the evaluation was Poor "P".

Water Resistance

The aforesaid dried coatings were each cut into a piece of 50×50 mm and dipped in warm water of 40° C. Seventy-two hours later, the coatings were weighed. A water absorption ratio of the coating films at 40° C. for 72 hours was calculated according to the following equation:

$$[(W1-W0)/W0] \times 100$$

wherein W0 is the initial weight of the coating film and W1 is the weight of the coating film after dipped in water for 72 hours.

Stain Resistance Against Rain Streak

The aforesaid coatings were each set to tilt at 10 degrees relative to a horizon. A rain gutter was set vertically so as to let rain run down in streaks from a roof on the surface of the coating film. After the coatings were left for 6 months keeping that condition, it was visually observed how the coating film was stained in comparison with the un-weathered coating film. The evaluation criteria are as follows.

Evaluation Standards:

S: the coating film is not stained at all and has the same appearance as that at the starting of the test.

A: the coating film is slightly stained, but almost no rain streak is confirmed.

B: the coating film is partially stained and rain streaks are slightly confirmed.

C: the coating film is stained significantly over the entire surface and rain streaks are clearly observed.

TABLE 3

|  |  | Example | | | | | | | |
|---|---|---|---|---|---|---|---|---|---|
|  |  | 1 | 2 | 3 | 4 | 5 | 6 | 7 | 8 |
| Component, part by mass | (A) Silicone-acrylic copolymer resin emulsion, (solid content %) | 8.4 (45.2%) | 8.4 (45.0%) | 8.4 (45.3%) | 8.4 (44.9%) | 8.4 (45.2%) | 8.4 (45.2%) | 34.2 (45.2%) | 8.4 (45.2%) |
|  | (B) Resin emulsion, (solid content %) | 183 (40%) | 183 (40%) | 183 (40%) | 183 (40%) | 209 (35%) | 170.2 (43%) | 143.3 (40%) | 183 (40%) |

TABLE 3-continued

| | | | Example 1 | 2 | 3 | 4 | 5 | 6 | 7 | 8 |
|---|---|---|---|---|---|---|---|---|---|---|
| | | White paste in Production Ex. 1 | 27.4 | 27.4 | 27.4 | 27.4 | 27.4 | 27.4 | 27.4 | 27.4 |
| | | Aqueous dispersion in Production Ex. 2 | 38 | 38 | 38 | 38 | 38 | 38 | 38 | |
| | | Aqueous dispersion in Production Ex. 3 | | | | | | | | 19 |
| | | Ion-exchanged water | 35 | 35 | 35 | 35 | 10 | 50 | 40 | 50 |
| | | Total mass of the composition | 291.8 | 291.8 | 291.8 | 291.8 | 292.8 | 294 | 282.9 | 268.8 |
| | | Solid content in the composition, % | 35.6% | 35.6% | 35.6% | 35.6% | 35.4% | 35.3% | 35.2% | 35.8% |
| Solid content | (A) | Preparation Example 1 | 3.8 | | | | 3.8 | 3.8 | 15.4 | 3.8 |
| | | Preparation Example 2 | | 3.8 | | | | | | |
| | | Preparation Example 3 | | | 3.8 | | | | | |
| | | Preparation Example 4 | | | | 3.8 | | | | |
| | | Comparative Preparation Example 1 | | | | | | | | |
| | | Comparative Preparation Example 2 | | | | | | | | |
| | | Comparative Preparation Example 3 | | | | | | | | |
| | (B) | Aron A-104 (40%) | 73.2 | 73.2 | 73.2 | 73.2 | | | 61.6 | 73.2 |
| | | Hydran WLF-213 (35%) | | | | | 73.2 | | | |
| | | Watersol BCD-3100 (43%) | | | | | | 73.2 | | |
| | (C) | Pigment | 19.2 | 19.2 | 19.2 | 19.2 | 19.2 | 19.2 | 19.2 | 19.2 |
| | (D) | Flame retardant | 3.8 | 3.8 | 3.8 | 3.8 | 3.8 | 3.8 | 3.8 | 3.8 |
| | (E) | Matting agent | 3.8 | 3.8 | 3.8 | 3.8 | 3.8 | 3.8 | 3.8 | — |
| | | Total solid content of components (A) to (D) | 100 | 100 | 100 | 100 | 100 | 100 | 100 | 100 |

TABLE 4

| | | Comparative Example 1 | 2 | 3 | 4 | 5 | 6 | 7 | 8 | 9 | 10 | 11 |
|---|---|---|---|---|---|---|---|---|---|---|---|---|
| Component, part by mass | (A) Silicone-acrylic copolymer resin emulsion, (solid content %) | 0 | 0 | 0 | 8.4 (45.5%) | 8.4 (45.0%) | 8.4 (45.0%) | 8.4 (45.2%) | 68.4 (45.2%) | 0.33 (45.2%) | 8.7 (45.2%) | 7.6 (45.2%) |
| | (B) Resin emulsion, (solid content %) | 192.5 (40%) | 220 (35%) | 179.1 (43%) | 183 (40%) | 183 (40%) | 183 (40%) | 183 (40%) | 115.5 (40%) | 192.1 (40%) | 190.25 (40%) | 158.5 (40%) |
| | White paste in Production Ex. 1 | 27.4 | 27.4 | 27.4 | 27.4 | 27.4 | 27.4 | 27.4 | 27.4 | 27.4 | 28.5 | 23.7 |
| | Aqueous dispersion in Production Ex. 2 | 38 | 38 | 38 | 38 | 38 | 38 | 38 | 38 | 38 | | |
| | Aqueous dispersion in Production Ex. 3 | | | | | | | | | | | 83 |
| | Aqueous dispersion in Production Ex. 4 | | | | | | | | | | 19 | 19 |
| | Ion-exchanged water | 35 | 10 | 50 | 50 | 35 | 35 | 35 | 40 | 35 | 45 | |
| | Total mass of the composition | 292.9 | 295.4 | 294.5 | 306.8 | 291.8 | 291.8 | 291.8 | 289.3 | 292.83 | 291.45 | 291.8 |
| | Solid content in the composition, % | 35.4% | 35.1% | 35.2% | 35.6% | 35.6% | 35.6% | 35.6% | 35.9% | 35.4% | 35.6% | 35.6% |
| Solid content | (A) Preparation Example 1 | | | | | | | | 30.8 | 0.15 | 3.9 | 3.4 |
| | Preparation Example 2 | | | | | | | | | | | |
| | Preparation Example 3 | | | | | | | | | | | |
| | Preparation Example 4 | | | | | | | | | | | |
| | Comparative Preparation Example 1 | | | | 3.8 | | | | | | | |

TABLE 4-continued

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Comparative Preparation Example 2 | | | | | 3.8 | | | | | | |
| | Comparative Preparation Example 3 | | | | | | 3.8 | | | | | |
| | Preparation Example 1 | | | | | | | | 3.8 | | | |
| (B) | Aron A-104 (40%) | 77 | | | 73.2 | 73.2 | 73.2 | 73.2 | 46.2 | 76.85 | 76.1 | 63.4 |
| | Hydran WLF-213 (35%) | | 77 | | | | | | | | | |
| | Watersol BCD-3100 (43%) | | | 77 | | | | | | | | |
| (C) | Pigment | 19.2 | 19.2 | 19.2 | 19.2 | 19.2 | 19.2 | 19.2 | 19.2 | 19.2 | 20 | 16.6 |
| (D) | Flame retardant | 3.8 | 3.8 | 3.8 | 3.8 | 3.8 | 3.8 | 3.8 | 3.8 | 3.8 | 0 | 16.6 |
| (E) | Matting agent | 3.8 | 3.8 | 3.8 | 3.8 | 3.8 | 3.8 | 3.8 | 3.8 | 3.8 | 3.8 | 3.8 |
| | Total solid content of components (A) to (D) | 100 | 100 | 100 | 100 | 100 | 100 | 100 | 100 | 100 | 100 | 100 |

TABLE 5

| | | Example | | | | | | | |
|---|---|---|---|---|---|---|---|---|---|
| | | 1 | 2 | 3 | 4 | 5 | 6 | 7 | 8 |
| Evaluation | Water contact angle, ° | 92 | 88 | 87 | 90 | 86 | 82 | 87 | 90 |
| | Stain resistance against crayon | A | A | A | A | A | A | A | A |
| | Weather resistance | E | E | E | E | E | E | E | E |
| | Water resistance | 7 | 4 | 5 | 6 | 15 | 12 | 8 | 9 |
| | Stain resistance against rain streak | S | S | S | S | S | S | S | S |

TABLE 6

| | | Comparative Example | | | | |
|---|---|---|---|---|---|---|
| | | 1 | 2 | 3 | 4 | 5 |
| Evaluation | Water contact angle, ° | 65 | 75 | 69 | 82 | 80 |
| | Stain resistance against crayon | C | C | C | B | C |
| | Weather resistance | P | P | P | E | E |
| | Water resistance | 22 | 30 | 25 | 22 | 7 |
| | Stain resistance against rain streak | C | C | C | B | C |

| | | Comparative Example | | | | | |
|---|---|---|---|---|---|---|---|
| | | 6 | 7 | 8 | 9 | 10 | 11 |
| Evaluation | Water contact angle, ° | 88 | 78 | 72 | 74 | 81 | 69 |
| | Stain resistance against crayon | C | C | B | C | B | C |
| | Weather resistance | P | P | P | P | P | P |
| | Water resistance | 22 | 23 | 32 | 21 | 22 | 20 |
| | Stain resistance against rain streak | C | C | B | C | C | C |

As seen in Tables 5 to 7, the coating composition of the present invention forms a coating having excellent water repellency, water resistance, and stain resistance. The present coating gives a substrate excellent water repellency, water resistance, rain streak stain resistance, stain resistance, and weather resistance while maintaining the design specific to the substrate. The coating composition of the present invention is water-based and, therefore, advantageous from the standpoints of workability and environment. The water-based coating composition of the present invention is suited for outer walls and building exteriors.

The invention claimed is:

1. A water-based coating composition for an outer wall or exterior of building, wherein the coating composition comprises water and the following components (A) to (D), (A) an emulsion of a silicone acrylic copolymer resin having a glass transition temperature of 0° C. or higher, and formed by copolymerization of 70 to 90 parts by mass of (a1) a polyorganosiloxane represented by the following formula (1) and 10 to 30 parts by mass of (a2) an acrylic acid alkyl ester monomer and/or a methacrylic acid alkyl ester monomer, a total amount of components (a1) and (a2) is 100 parts by mass, wherein the emulsion particles of the emulsion of the silicone acrylic copolymer resin (A) have an average particle diameter of 230 nm to 350 nm, and, in the acrylic acid alkyl ester monomer and/or a methacrylic acid alkyl ester monomer, the alkyl ester is a 1 to 6 carbon alkyl ester,

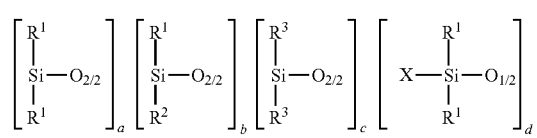

(1)

wherein $R^1$ is, independently of each other, a substituted or unsubstituted monovalent hydrocarbon group having 1 to 6 carbon atoms, precluding the groups defined for $R^2$ and a phenyl group; $R^2$ is, independently of each other, an alkyl group which has 1 to 6 carbon atoms and of which a part of the hydrogen atoms bonded to the carbon atom is substituted with a methacryloxy group; $R^1$ bonded to the siloxane unit in the square bracket b is a methyl group; $R^3$ is, independently of each other, a phenyl group or the group defined for $R^1$, and at least one of $R^3$s bonded to the same silicon atom is a phenyl group; and X is, independently of each other, an alkoxy group having 1 to 4 carbon atoms, or a hydroxyl group; a, b, c and d are the number satisfying equations, $0.6722 \leq a/(a+b+c+d) < 0.9993$, $0.0003 \leq b/(a+b+c+d) \leq 0.0048$, $0 \leq c/(a+b+c+d) \leq 0.285$, and $0.0004 \leq d/(a+b+c+d) \leq 0.038$;

wherein (a1) the polyorganosiloxane is obtained by a reaction of a silane coupling agent and a cyclic organopolysiloxane, in a ratio such that the silane coupling agent is 0.08 to 0.32 part by mass, relative to 100 parts by mass of the cyclic organopolysiloxane, the emulsion being in an amount of 3.8 to 15.4 parts by mass as a solid content, (B) at least one resin emulsion in an amount of 61.6 to 73.2 parts by mass as a solid content, selected from the group consisting of an acrylic resin emulsion, a urethane resin emulsion, and an alkyd resin emulsion, (C) pigment in an amount of 5 to 19.2 parts by mass as a solid content, and (D) a flame retardant in an amount of 1 to 3.8 parts by mass as a solid content, provided that a total mass of the solid contents of components (A) and (B) and the amounts of components (C) and (D) is 100 parts by mass.

2. The water-based coating composition according to claim 1, further comprising a matting agent (E) in an amount of 0.5 to 20 mass % as a solid content, based on the total mass of the coating composition.

3. A coating formed from the water-based coating composition according to claim 1.

4. An article comprising a substrate and the coating according to claim 3, wherein the coating is present on one or both surfaces of the substrate.

5. The article according to claim 4, wherein the substrate is selected from the group consisting of a ceramic building material, a concrete substrate, a wood substrate, a metal substrate and a mortar substrate.

6. A building material for an outer wall, wherein the building material comprises the article according to claim 4.

7. A building material for a building exterior, wherein the building material comprises the article according to claim 4.

* * * * *